US012747712B2

(12) United States Patent
Kashi et al.

(10) Patent No.: US 12,747,712 B2
(45) Date of Patent: Sep. 29, 2026

(54) POWER ASSEMBLY CRAB PLATE FOR ENGINE

(71) Applicant: Progress Rail Locomotive Inc., LaGrange, IL (US)

(72) Inventors: Swathi Kashi, Downers Grove, IL (US); Shannon W. Omori, Evanston, IL (US); Raji Rexavier, Plainfield, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 230 days.

(21) Appl. No.: 18/758,278

(22) Filed: Jun. 28, 2024

(65) Prior Publication Data

US 2026/0002489 A1 Jan. 1, 2026

(51) Int. Cl.
*F02F 1/24* (2006.01)

(52) U.S. Cl.
CPC .................................... *F02F 1/24* (2013.01)

(58) Field of Classification Search
CPC ...................................................... F02F 1/24
See application file for complete search history.

(56) References Cited

U.S. PATENT DOCUMENTS 1,388,570 A * 8/1921 Jewell ...................... B60Q 1/34 116/44
4,175,229 A * 11/1979 Brinkhof .................. H05B 3/04 403/252
4,385,595 A * 5/1983 Shaw ........................ F02F 1/16 123/193.2
4,491,376 A * 1/1985 Gladd .................. H01R 12/724 439/79
5,195,468 A 3/1993 Clark et al.
5,373,630 A 12/1994 Lucier et al.
5,521,457 A * 5/1996 Kawasaki ................. B06B 1/06 310/354
6,111,338 A * 8/2000 Otsuchi .................. H03H 9/176 310/353
8,266,747 B1 * 9/2012 Sobran ................. A47C 27/003 5/678

(Continued)

FOREIGN PATENT DOCUMENTS

CN 205345646 U * 6/2016
CN 206175421 U * 5/2017
JP 2001234810 A 8/2001

*Primary Examiner* — Lindsay M Low
*Assistant Examiner* — Susan E Scharpf

(57) ABSTRACT

A crab plate for securing a power assembly of an engine includes a body having a length direction oriented with respect to a central longitudinal plane, a width direction normal to the central longitudinal plane, and a thickness direction extending between a top surface and a bottom surface of the body. The body further including a generally double-arrow shape including an arrowhead portion located at each of a first longitudinal end and a second longitudinal end of the body. The body further includes a pair of retaining holes extending through the thickness of the body, the pair of retaining holes located along the central longitudinal plane; a pair of wing portions forming laterally outward opposite sides of the body; and a protruding contact pad on the bottom surface of each of the wing portions, the contact pads having a length that is less than a length between the widest portions of the arrow heads.

20 Claims, 5 Drawing Sheets

(56) References Cited

U.S. PATENT DOCUMENTS

| | | | |
|---|---|---|---|
| 10,415,498 B2 | 9/2019 | Funk et al. | |
| 2002/0028507 A1* | 3/2002 | Heimberg | B01L 3/50853 435/283.1 |

* cited by examiner

POWER ASSEMBLY CRAB PLATE FOR ENGINE

TECHNICAL FIELD

The present disclosure relates generally to a power assembly of an engine, and more particularly, to a power assembly retention system including a plurality of crab plates.

BACKGROUND

Engines may be used in various capacities, including propelling mobile industrial machines. Engines, such as internal combustion engines for example, may generate a significant amount of heat and force during operation, thereby requiring both a cooling system for dispelling the excess heat with coolants, and a retention system to keep the engine components in their proper position during operation. Coolant flowing through the engine may be conveyed to a crankcase through coolant passages provided in various components of the engine, including the power assemblies (cylinder heads, cylinder liners, pistons, valve heads, etc.) of the engine. The voids created by the coolant passages may cause strength variations in the engine components, such as the cylinder head. These strength variations may be susceptible to mechanical fatigue and even failure resulting from undesired stresses on the engine. In one instance, stresses may be induced by improper over-clamping pressures applied by crab plates used to secure the power assemblies to the crankcase. Such over-clamping may lead to the propagation of cracks in the cylinder head, and such cracks can eventually lead to additional problems with the engine.

A crab plate for a cylinder head is disclosed in U.S. Pat. No. 10,415,498 ("the '498 Patent"), issued on Sep. 17, 2019, to Funk et al. The crab plate described in the '498 Patent is used in coordination with a coolant system for an engine. While the crab plate of the '498 Patent may be helpful in some circumstances, such as retaining the cylinder head in place within the engine, the crab plate may be susceptible to over-clamping resulting in potential undesired stresses on the cylinder head.

Aspects of the present disclosure may solve one or more of the problems set forth above and/or other problems in the art. The scope of the current disclosure, however, is defined by the attached claims, and not by the ability to solve any specific problem.

SUMMARY

In one aspect, a crab plate for securing a power assembly of an engine includes a body having a length direction oriented with respect to a central longitudinal plane, a width direction normal to the central longitudinal plane, and a thickness direction extending between a top surface and a bottom surface of the body. The body further including a generally double-arrow shape including an arrowhead portion located at each of a first longitudinal end and a second longitudinal end of the body. The body further includes a pair of retaining holes extending through the thickness of the body, the pair of retaining holes located along the central longitudinal plane; a pair of wing portions forming laterally outward opposite sides of the body; and a protruding contact pad on the bottom surface of each of the wing portions, the contact pads having a length that is less than a length between the widest portions of the arrow heads.

A crab plate for securing a power assembly of an engine includes a body including a length direction oriented with respect to a central longitudinal plane, a width direction normal to the central longitudinal plane, and a thickness direction extending between a top surface and a bottom surface of the body. The body further including a generally double-arrow shape including an arrowhead portion located at each of a first longitudinal end and a second longitudinal end of the body. The body further includes a pair of retaining holes extending through the thickness of the body, the pair of retaining holes located along the central longitudinal plane; a pair of wing portions forming laterally outward opposite sides of the body, the wing portions each include a pair of longitudinally spaced cutout portions; and a protruding contact pad on the bottom surface of each of the wing portions, the contact pads each terminate longitudinally at the cutout portions.

A crab plate for securing a power assembly of an engine includes a body including a length direction oriented with respect to a central longitudinal plane, a width direction normal to the central longitudinal plane, and a thickness direction extending between a top surface and a bottom surface of the body. The body further including a generally double-arrow shape including an arrowhead portion located at each of a first longitudinal end and a second longitudinal end of the body. The body further includes a pair of retaining holes extending through the thickness of the body, the pair of retaining holes located along the central longitudinal plane; a pair of wing portions forming laterally outward opposite sides of the body, the wing portions each include a pair of longitudinally spaced cutout portions; and a protruding contact pad on the bottom surface of each of the wing portions, the contact pads each having a surface area within a range of approximately 5 to 5.5 inches squared.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
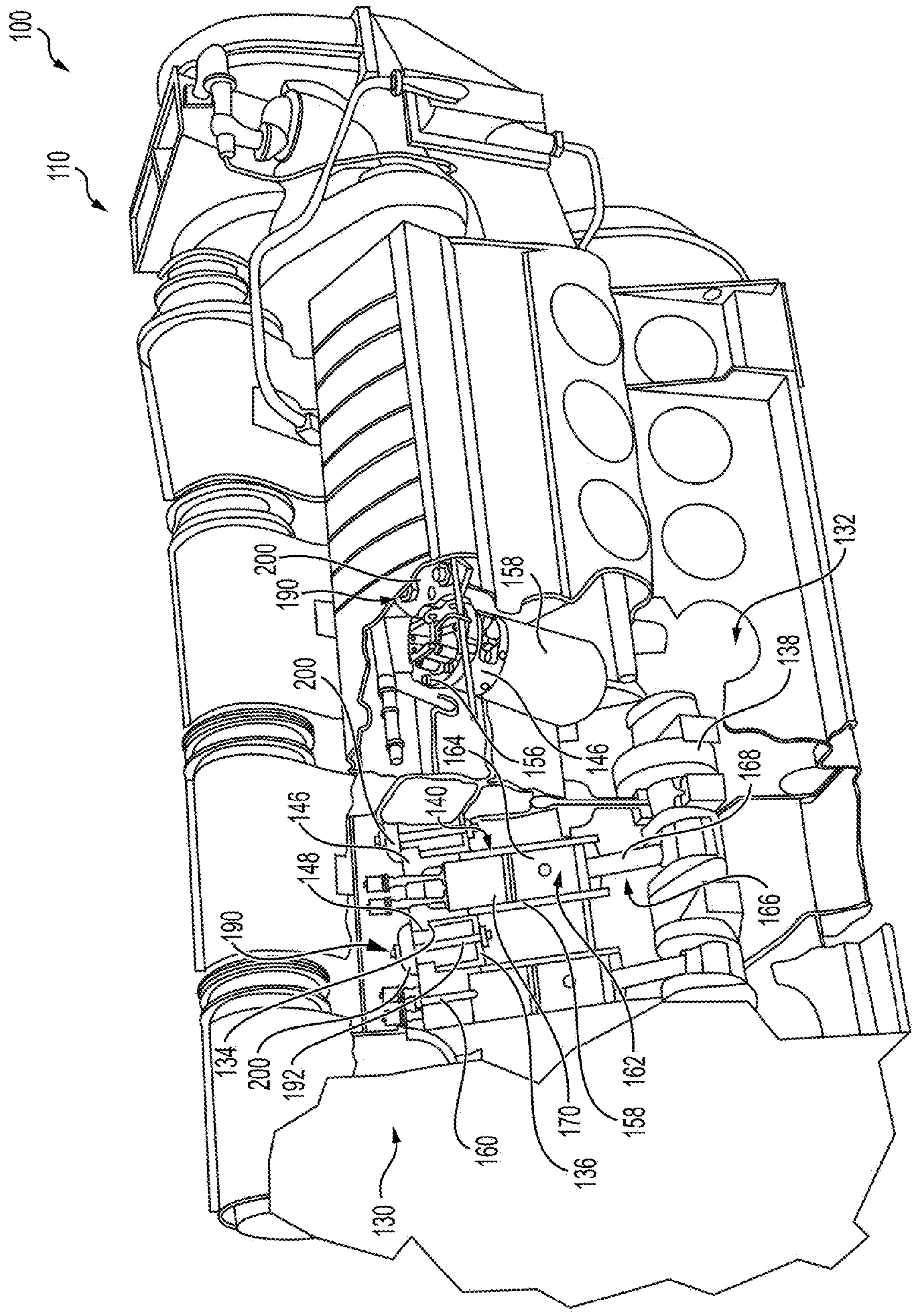
FIG. 1 is a perspective view of an exemplary engine, according to aspects of the disclosure.

FIG. 1 illustrates a perspective view of an engine 100. It should be recognized that the concepts of the present disclosure may be applicable to any type or configuration of engine 100. In FIG. 1, the exemplary engine 100 is an internal combustion engine, more specifically a reciprocating piston engine. In terms of fuel, the engine 100 may utilize one or a combination of diesel fuel, gasoline, biodiesel, dimethyl ether, alcohol, natural gas, propane, or other similar types of combustion fuel. Furthermore, the engine 100 may be incorporated into various machines including, but not limited to, for example, locomotives, mobile industrial machines, and stationary electric generators. In the illustrated embodiment, the engine 100 is used in a locomotive (not shown).

Figure 2:
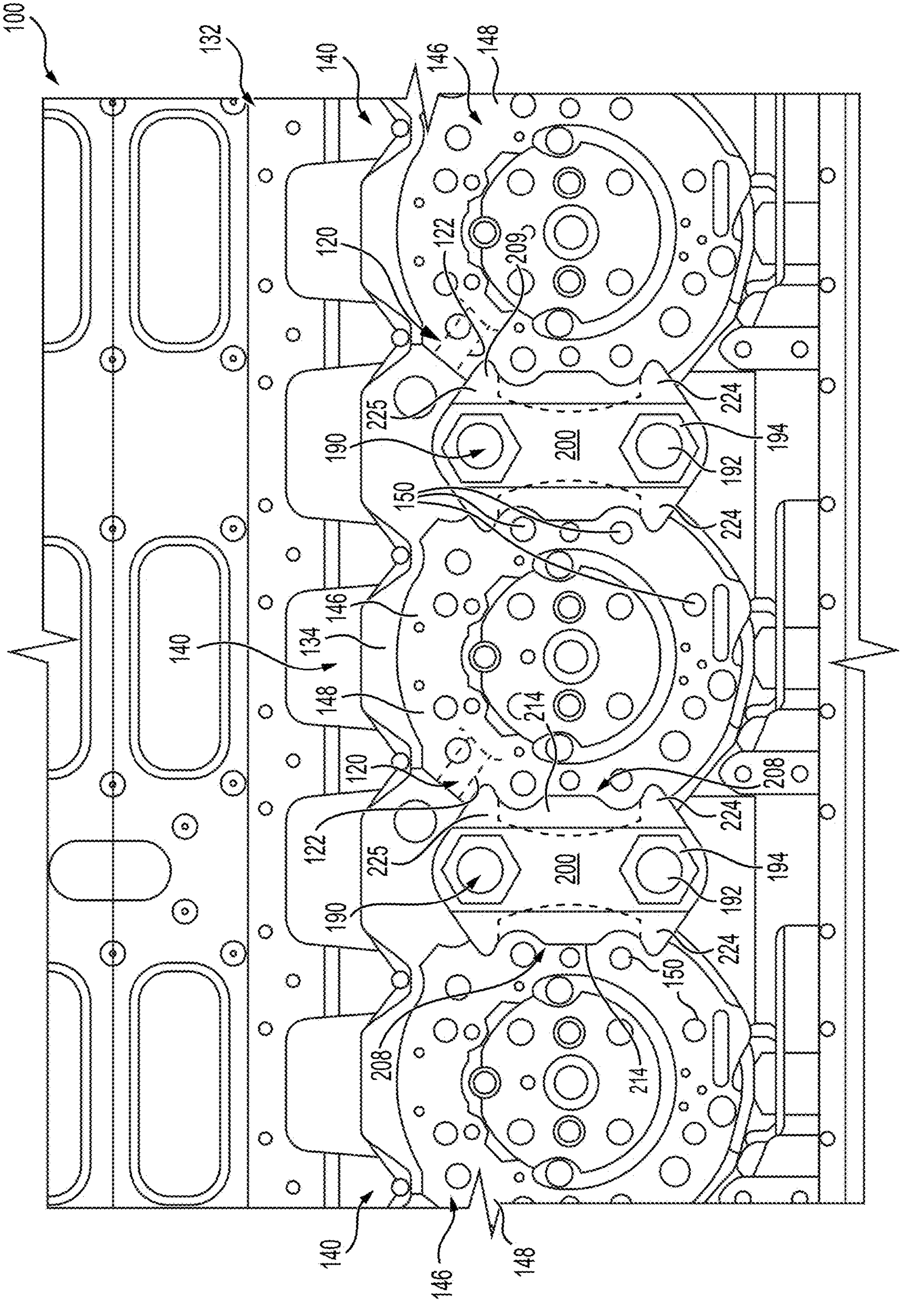
FIG. 2 is a partial top view of a cylinder bank housed in the crankcase of the engine of FIG. 1.

The engine 100 of FIG. 1 generally includes an engine system 130, an air/exhaust system 110, and a cooling system having cooling passages 120 (dashed line in FIG. 2). The engine system 130 includes, among other things, a crankcase 132 that includes a plurality of portholes (not shown) for receiving individual power assemblies 140 therein. Each power assembly 140 of the engine system 130 may include, among other things, a cylinder head 146 (including intake valves, exhaust valves, and a fuel injector 160), a cylinder liner 158, and a piston assembly 162. The power assemblies 140 may be arranged in the crankcase 132 in any one of a number of engine configurations including, but not limited, to an inline engine configuration, a radial engine configuration, a V-type engine configuration, or any other similar engine configuration. For example, FIG. 1 illustrates the engine 100 as having a V-type engine configuration with the plurality of power assemblies 140 arranged into a pair of cylinder banks where cylinder heads 146 are aligned in either a first cylinder bank or a second cylinder bank.

The power assemblies 140 may be removed from the portholes of the crankcase 132 as a single unit for ease of maintenance. Wherein, the cylinder liner 158 may be mechanically coupled to the cylinder head 146 via a cylinder head attachment assembly 156 (FIG. 1) including a plurality of threaded bolts or studs that extend through a corresponding plurality of cylinder head through holes 150 (FIG. 2). The individual power assemblies 140 may be clamped down against the crankcase 132, and are thus fixedly secured within the portholes of the crankcase 132 by a pair of crab plates 200, as will be described in more detail below. It should be noted that the number of power assemblies 140 associated with the engine system 130 may vary based on system requirements. For example, engine 100 may include 8, 12, 16, or 20 power assemblies, corresponding to the number of engine cylinders.

The piston assembly 162 of each power assembly 140 may include a piston 164, piston rings (not shown), and a connection assembly 166 to a crankshaft 138. The connection assembly 166 may include a connecting rod 168 that is mechanically coupled to a bottom surface of a piston 164 and to a segment of the crankshaft 138. Energy is generated within a combustion chamber 170 of the individual power assembly 140, causing the piston 164 to reciprocate within the cylinder liner 158, resulting in the rotation of the crankshaft 138.

FIG. 2 provides a top view of a plurality of power assemblies 140 secured in the crankcase 132. The cylinder heads 146 of each power assembly 140 may include a generally round top forming a top flange 148 configured to abut a top surface 134 of the crankcase 132. The cylinder head 146 may include a plurality of engine components, such as the fuel injector 160, intake valves, and exhaust valves. Many of these components (fuel injector 160, intake and exhaust valve assemblies, rocker arm units, and the cylinder head attachment assembly 156) are shown in FIG. 1, but have been removed from FIG. 2 for clarity.

The cooling passages of the engine cooling system 120 may be included in the cylinder head 146 and are adapted to facilitate removal of excessive or waste heat from portions of the power assemblies 140 and to keep the power assemblies 140 within a range of allowable operating temperatures. While the engine 100 may incorporate either air-cooling or liquid cooling in the cooling system 120, the exemplary engine 100 of FIG. 1 is a liquid-cooled engine that utilizes engine coolant containing a mixture of water and chemicals, such as antifreeze and rust inhibitors, without any limitations. As part of the cooling system 120, each cylinder head 146 includes a number of internal cooling passages that are in fluid communication with an engine radiator (not shown) to allow for the passage of a coolant therethrough. For example, as shown in FIG. 2, the top flange 148 of cylinder head 146 includes a coolant discharge passage 122 (shown in dashed lines) that provides an internal pathway for the engine coolant to exit from the cylinder head 146.

FIGS. 1 and 2 will now be referenced with respect to the clamping or securing of the power assemblies 140 within the crankcase 132 by crab plates 200. A pair of crab plates 200 abut the top surfaces of adjacent cylinder heads 146, specifically along radially outer portions of the cylinder heads 146. For example, as shown in FIG. 2, one crab plate 200 may extend to cover a radially outer portion of the top flange 148 from approximately a 2 o'clock to 4 o'clock position on a first cylinder head 146 and approximately an 8 o'clock to 10 o'clock position on an adjacent, second cylinder head 146, while another crab plate 200 may be similarly positioned, extending between approximately an 8 o'clock and a 10 o'clock position on the adjacent, second cylinder head 146 and extending from approximately a 2 o'clock to 4 o'clock position on an adjacent, third cylinder head 146. The crab plates 200 are secured to the crankcase 132 via a crab plate retention assembly 190 that includes a pair of bolts 192 and corresponding pair of retention nuts 194 (FIG. 1). As shown in exemplary FIG. 1, the crab plate 200 is mechanically coupled to the lower wall portions 136 of the crankcase 132 via the pair of bolts 192 and retention nuts 194, thereby clamping the top flange 148 of the cylinder head 146 against the top surface 134 of the crankcase 132. As will be discussed in more detail below, the secured crab plates 200 are located on the radially outer portions of the top flange 148 near coolant discharge passage 122. For example, as shown in FIG. 2, an end a wing portion 209 of crab plate 200 may be located adjacent coolant discharge passage 122.

Figure 3A:
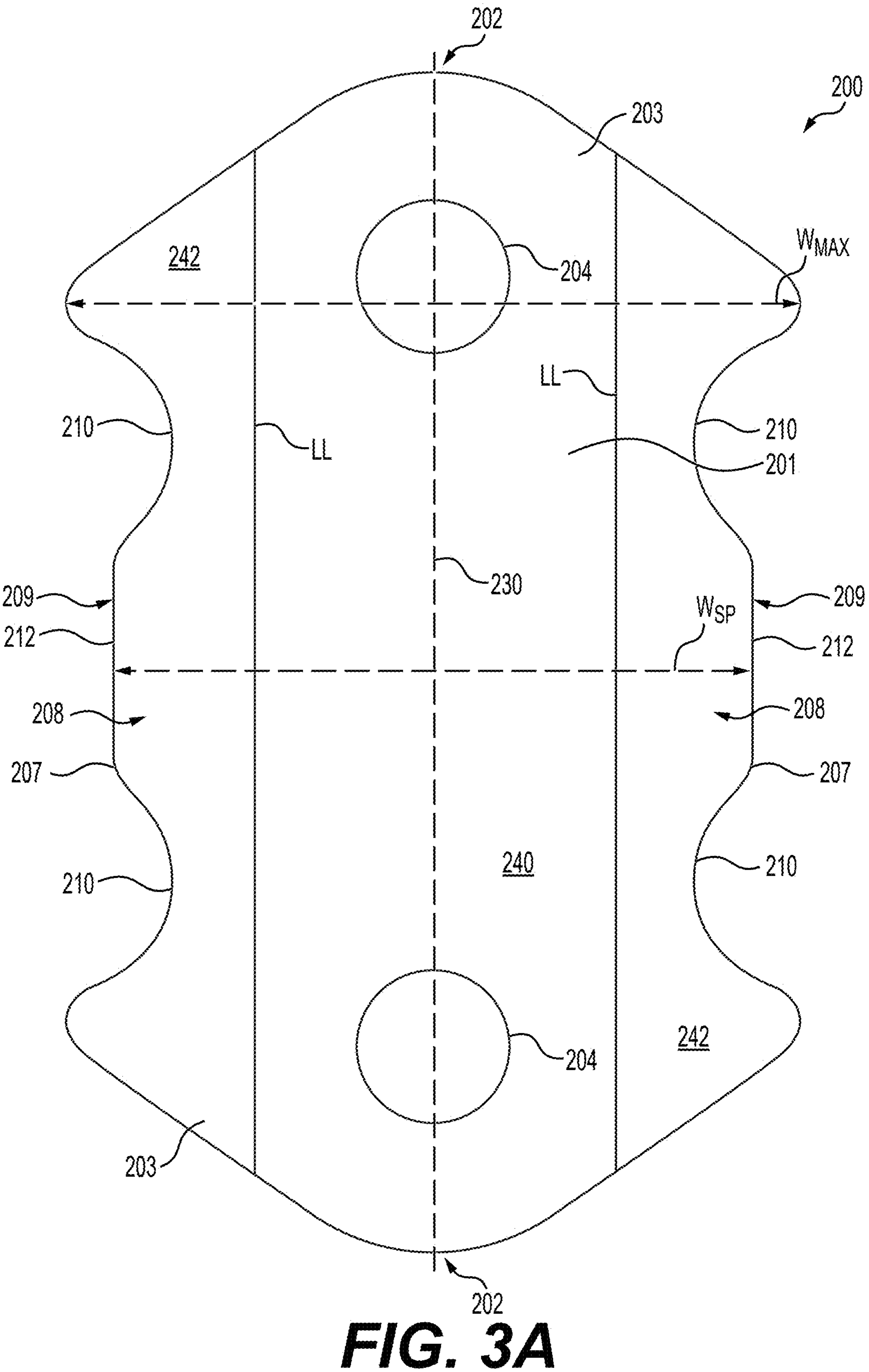
FIG. 3A is a top view of an individual crab plate of the power assembly of FIG. 2.
Figure 3B:
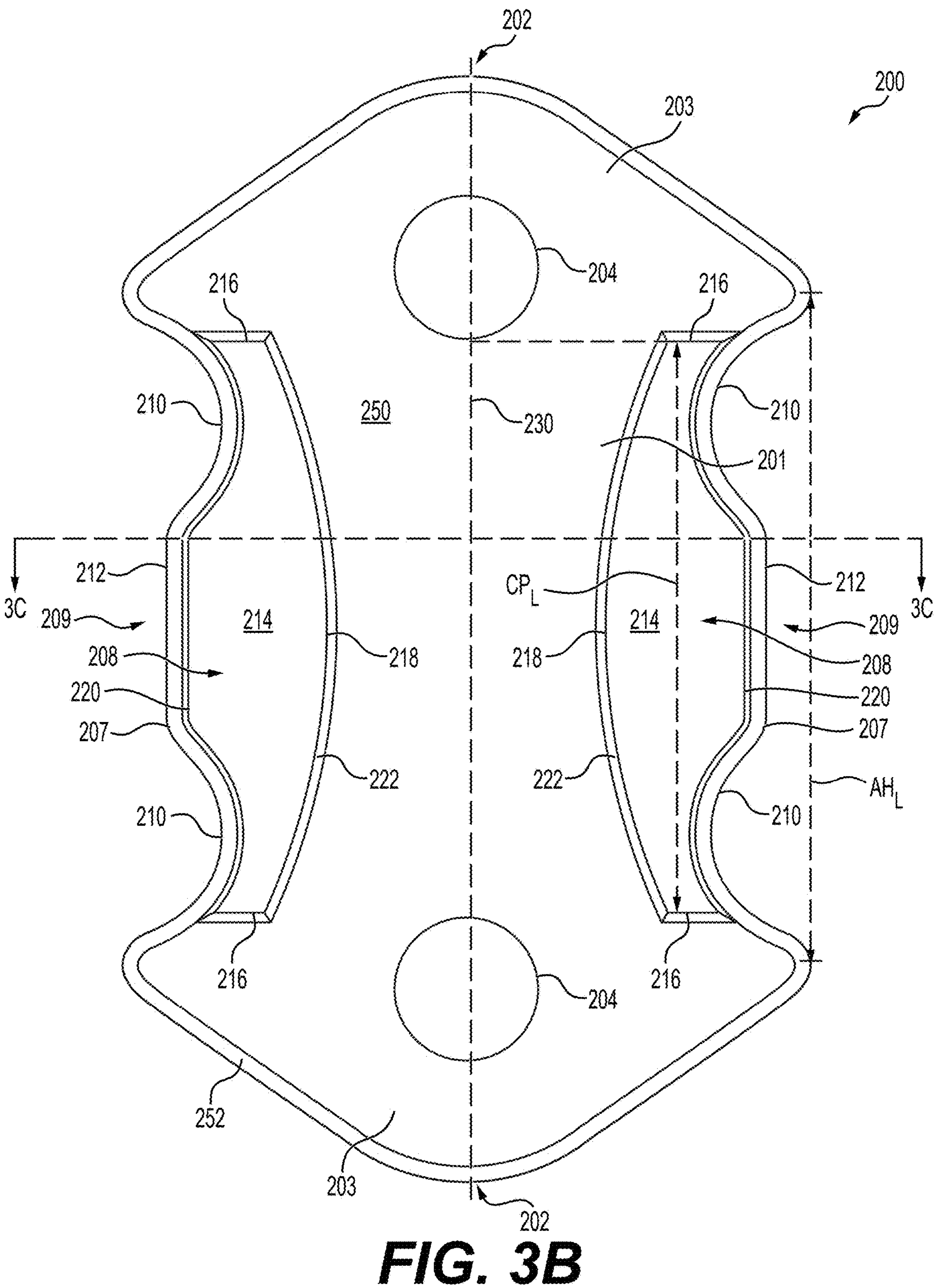
FIG. 3B is a bottom view of the individual crab plate of the power assembly of FIG. 2.
Figure 3C:
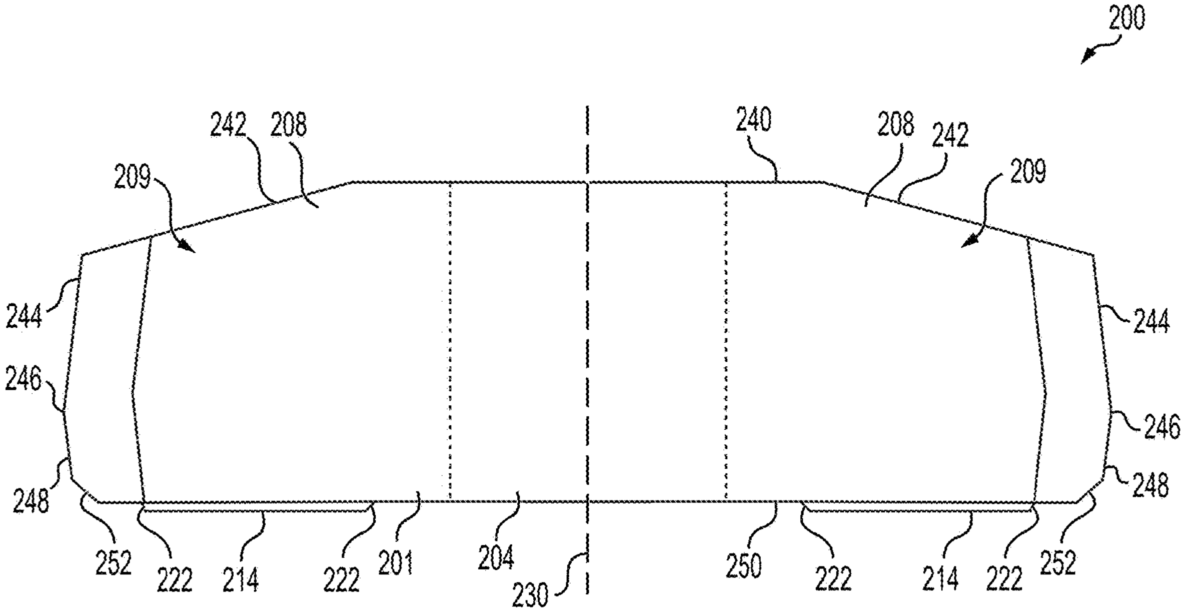
FIG. 3C is a cross-sectional view taken through line 3C-3C of FIG. 3B of a portion of the individual crab plate.

FIGS. 3A-3C show various views of an individual crab plate 200, specifically a top view (FIG. 3A), a bottom view (FIG. 3B), and a cross-sectional view (FIG. 3C). As shown in FIGS. 3A and 3B, each individual crab plate 200 includes a central longitudinal or main body 201, and a pair of wing portions 209 on each side of the central longitudinal body 201. The central longitudinal body 201 (for example, as delineated between longitudinal lines LL in FIG. 3A) of each crab plate 200 includes a length extending along a longitudinal plane 230 and a width extending normal to the longitudinal plane 230. The crab plate 200 is generally symmetrical about the longitudinal plane 230 and about a central width plane. The shape of the crab plate 200 may be also be described as approximating a double arrow, with a pair of arrowhead portions 203 being located on either longitudinal end 202 of the crab plate 200, and a pair of medial winged portions 208 located between the arrowhead portions 203 and extending laterally outward from either side of the central longitudinal body 201. The pair of medial winged portions 208 include a pair of identical outer side surfaces 207, with each outer side surface 207 including a pair of longitudinally spaced concave cutouts 210 and a straight portion 212 located between the concave cutouts 210. The concave cutouts 210 form bottom ends of the arrowhead portions 203 and are positioned to accommodate the fasteners of cylinder head attachment assembly 156 (FIGS. 1 and 2). From this perspective, the straight portions 212 define a width $w_{sp}$ of the crab plate 200 that is less than the maximum width $w_{max}$ of the arrowhead portions 203. The crab plate 200 also includes a pair of retention through holes 204 located along the central longitudinal plane 230 and centrally located within the arrowhead portions 203. The shape of crab plate 200 shown in FIGS. 3A-3C is exemplary only, and other shapes may be employed for crab plate 200.

As shown in FIGS. 3A and 3C, the central longitudinal body 201 may include a top planar surface 240 extending normal to the thickness of the crab plate 200. A top surface 242 of the wing portions 209 (outside of the central longitudinal body 201) may be planar and angled downward relative to the top planar surface 240 so that the thickness of the wing portions 209 decreases in the width direction toward the outer side surfaces 207. As such, the thickness of the wing portions 209 is variable when compared to a uniform thickness of the central longitudinal body 201. The top planar surface 240 of the central longitudinal body 201 may also include a smooth or polished surface in order to provide a level surface for securing retention nuts 194 (FIG. 2). The angled surfaces 242 may further include unfinished or rough surface finishes when compared to the highly polished surface of the top planar surface 240.

As shown in FIGS. 3B and 3C, the crab plate 200 incudes a bottom planar surface 250 that is generally symmetrical about the longitudinal plane 230. The bottom planar surface 250 of the crab plate 200 extends to a peripheral chamfer 252 extending around the entirety of the crab plate 200.

The wing portions 209, and in particular the medial winged portions 208, of the crab plate 200 each include a protruding contact pad 214 that extends outward from the bottom planar surface 250 in the thickness direction. The protruding contact pads 214 are generally flat or planar, and may protrude a thickness of, for example, 0.050 to 0.070 inches. As shown in FIG. 3B, the protruding contact pads 214 are bounded by a pair of outermost longitudinal edges 216, a medial inner edge 218 positioned adjacent to the central longitudinal body 201, and a medial outer edge 220 positioned adjacent to or coterminous with the peripheral chamfer 252. The protruding contact pads 214 may themselves include a chamfer at the edges 216, 218, 220, for example a pad chamfer 222 extending around the entirety of each contact pad 214. Further, pad chamfer 222 may include a blend radius of approximately 0.06 inches at the transition between the pad chamfer 222 and the bottom planar surface 250 of crab plate 200. Alternatively, contact pads 214 may omit a chamfer and have a straight edge extending normal to the planar surface 250.

Referring to FIG. 3B, the outermost longitudinal edges 216 of the contact pads 214 are straight and extend in a width direction normal to the central longitudinal plane 230. The outermost longitudinal edges 216 form a contact pad 214 having a length $CP_L$ that is less than the longitudinal length $AH_L$ extending between the widest portions of the arrowhead portions 203 (on the same side of the crab plate 200). The longitudinal ends of the contact pads 214 terminate longitudinally (via outermost longitudinal edges 216) at the concave cutouts 210. In particular, the outermost longitudinal edges 216 intersect the concave cutouts 210 at a longitudinally outer half of the concave cutouts 210, which also corresponds to a longitudinally inner end portion of the arrowhead portion 203. Further, the outermost longitudinal edges 216 of the contact pads 214 may generally align with the longitudinally inner-most edge of the retention through holes 204 (as shown by a dashed line in FIG. 3B) or may overlap only slightly in a longitudinal direction with the retention through holes 204. For example, the overlap may be less than 10%, and the contact pads 214 may overlap with the retention through holes 204 substantially along approximately the pad chamfer 222 of the longitudinal edges 216. Further, as shown in FIG. 3B, the contact pad 214 includes its lateral-most extent or widest extent on the crab plate 200 at the medial outer edge 220. The lateral-most extent of the contact pad 214 is less than the lateral-most extent of the arrowhead portions.

The medial inner edge 218 of contact pad 214 extends between the outermost longitudinal edges 216 in a generally arc-like or concave shape, while the medial outer edge 220 follows the contours of the outer side surface 207 of the medial winged portions 208. The pad chamfer 222 may be the same as or different from the peripheral chamfer 252 of the bottom planar surface 250. For example, as shown in FIGS. 3B and 3C, the protruding contact pads 214 are adjacent to and spaced from the peripheral chamfer 252. The protruding contact pads 214 may include a length (measured between the outermost longitudinal edges 216) that ranges from approximately 5.21 to 5.23 inches and a width (measured from a midpoint in the medial inner edge 218 to the straight portion 212 of the medial winged portion 208) ranging from approximately 1.52 to 1.54 inches. The protruding contact pads 214 may also include a surface area that ranges from approximately 5 to 5.5 inches squared, and more particularly from approximately 5.2 to 5.4 inches squared.

FIG. 3C depicts the cross-sectional view of the crab plate 200, and illustrates the top planar surface 240 accompanied by the two angled surfaces 242 of the wing portions 209. The angled surfaces 242 extend from either side of the top planar surface 240 to pairs of angled sidewalls—upper sidewall 244, and lower sidewall 248. The pairs of angled sidewalls 244, 248 meet along an outermost edge 246 of the crab plate 200. The lower sidewall 248 extends outward (relative to the longitudinal plane 230) from the bottom planar surface 250 to the outermost edge 246, while the upper sidewall 244 extends inward (relative to the longitudinal plane 230) from the outermost edge 246 to the top planar surface 240. FIG. 3C also depicts the bottom planar surface 250 of the crab plate 200 and the pair of protruding contact pads 214 extending therefrom. Due to the size and position of the protruding contact pads 214 on the crab plate 200, the protruding contact pads 214 make planar contact with the radially outer portions of the cylinder head 146, such that the contact areas of the protruding contact pads 214 are spaced away from the coolant discharge passage 122 (FIG. 2) while retaining the power assemblies 140 within the crankcase 132.

The crab plates 200 are made of a high strength steel material, such as 4140 steel or other similar materials, and maximum thickness of approximately 2 inches, but may vary based on system requirements.

INDUSTRIAL APPLICABILITY

The crab plates 200 of the present disclosure find industrial applicability in securing power assemblies 140 within an engine 100. The individual crab plates 200 are fabricated in a manner to reduce the overall footprint of a pair of protruding contact plates 214 on a top flange 148 of a cylinder head 146, thereby reducing a stress area imparted onto the cylinder head 146 by the crab plate 200.

As noted above, within engine 100, a crankcase 132 is configured to house a plurality of power assemblies 140, which include a cylinder head 146 and a cylinder liner 158. The power assemblies 140 are inserted into a plurality of portholes in the crankcase 132, such that the cylinder liners 158 are housed within the crankcase 132 and the cylinder heads 146 are located on the exterior of the porthole openings of the crankcase 132. A crab plate retention assembly 190 includes a pair of threaded central bolts 192 extending from the lower wall portions 136 of the crankcase 132 to a top surface 134 of the crankcase 132. The central bolts 192 extend between a pair of adjacent power assemblies 140 and align with the retention holes 204 of the individual crab plates 200, as shown in FIGS. 1 and 2. The central bolts 192 are threaded through the retention through holes 204 of the individual crab plate 200, and a pair of threaded retention nuts 194 are attached to the pair of central bolts 192 on a top planar surface 240 of the individual crab plate 200.

The crab plate 200 is then secured in position via the pair of threaded retention nuts 194. The crab plate 200 is positioned such that the pair of protruding contact pads 214 (extending from a bottom planar surface 250 of the crab plate 200) make planar contact with radially outer portions of the top flange 148 of the cylinder head 146. As shown in FIGS. 1 and 2, the crab plate 200, specifically the medial winged portions 208 (FIGS. 3A-3C), covers the radially outer portions of the top flange 148. Several substantially concave cutouts 210 of the crab plate 200 are positioned adjacent to and spaced from the cylinder head attachment assembly 156, thereby providing adequate clearance for the cylinder head attachment assembly 156 to couple the cylinder head 146 and the cylinder liner 158 together within the crankcase 132. As shown best in dashed lines in FIG. 2, the location of the contact pads 214 of crab plate 200, and in particular the location of the outermost longitudinal edges 216 of the contact pads 214 on the radially outer portions of the cylinder head top flange 148 limits the interaction of forces on the internal passages of the cooling system 120 within the cylinder head 146, specifically the coolant discharge passage 122.

In accordance with the present disclosure, the crab plates 200, and in particular the location of the protruding contact pads 214, may facilitate reducing high stress areas around internal passages of the cylinder head 146, such as the coolant discharge passage 122. Such a reduction of stress areas around coolant discharge passage 122 may assist in avoiding detrimental fatigue associated with over-torqueing the crab plate fasteners 192, 194. This may reduce mechanical fatigue and may limit potential cracks forming in the cylinder head 146 between the contact of the contact pads 214 and the coolant discharge passage 122 and, by extension, decrease the chances for engine failure due to coolant leaks from the power assemblies 140.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A crab plate for securing a power assembly of an engine, comprising:

a body including a length direction oriented with respect to a central longitudinal plane, a width direction normal to the central longitudinal plane, and a thickness direction extending between a top surface and a bottom surface of the body;

the body further including a generally double-arrow shape including an arrowhead portion located at each of a first longitudinal end and a second longitudinal end of the body, wherein the body further includes:

a pair of retaining holes extending through the thickness of the body, the pair of retaining holes located along the central longitudinal plane;

a pair of wing portions forming laterally outward opposite sides of the body; and a protruding contact pad on the bottom surface of each of the wing portions, the contact pads having a length that is less than a length between the widest portions of the arrow heads.

2. The crab plate of claim 1, wherein the contact pads each have a pair of straight outermost longitudinal edges that extend normal to the central longitudinal plane.

3. The crab plate of claim 1, wherein the pair of wing portions each include a pair of longitudinally spaced cutout portions, and the contact pads each terminate longitudinally at the cutout portions.

4. The crab plate of claim 3, wherein the contact pads each terminate longitudinal at a longitudinally outer half of the cutout portions.

5. The crab plate of claim 1, wherein the contact pads each terminate longitudinal at a longitudinally inner end portion of the arrowhead portions.

6. The crab plate of claim 1, further including a pair of through holes extending through a thickness of the crab plate, the through holes being centered on the central longitudinal plane, and the contact pads each terminate longitudinally at approximately a longitudinally inner-most edge of the through holes.

7. The crab plate of claim 1, wherein the lateral-most extent of each contact pad is laterally less than the lateral-most extent of the arrowhead portions.

8. The crab plate of claim 1, wherein the lateral-most extent of each contact pad is located between a pair of longitudinally spaced cutout portions of the wing portions.

9. The crab plate of claim 1, wherein a surface area of each contact pad is within a range of approximately 5 to 5.5 inches squared.

10. The crab plate of claim 1, wherein the crab plate is made of 4140 steel.

11. A crab plate for securing a power assembly of an engine, comprising:

a body including a length direction oriented with respect to a central longitudinal plane, a width direction normal to the central longitudinal plane, and a thickness direction extending between a top surface and a bottom surface of the body;

the body further including a generally double-arrow shape including an arrowhead portion located at each of a first longitudinal end and a second longitudinal end of the body, wherein the body further includes:

a pair of retaining holes extending through the thickness of the body, the pair of retaining holes located along the central longitudinal plane;

a pair of wing portions forming laterally outward opposite sides of the body, the wing portions each include a pair of longitudinally spaced cutout portions; and a protruding contact pad on the bottom surface of each of the wing portions, the contact pads each terminate longitudinally at the cutout portions.

12. The crab plate of claim 11, wherein the contact pads each have a pair of straight outermost longitudinal edges that extend normal to the central longitudinal plane.

13. The crab plate of claim 11, wherein the contact pads each terminate longitudinal at a longitudinally outer half of the cutout portions.

14. The crab plate of claim 11, wherein the contact pads each terminate longitudinal at a longitudinally inner end portion of the arrowhead portions.

15. The crab plate of claim 11, further including a pair of through holes extending through a thickness of the crab plate, the through holes being centered on the central longitudinal plane, and the contact pads each terminate longitudinally at approximately a longitudinally inner-most edge of the through holes.

16. The crab plate of claim 11, wherein the lateral-most extent of each contact pad is laterally less than the lateral-most extent of the arrowhead portions.

17. The crab plate of claim 11, wherein the lateral-most extent of each contact pad is located between the pair of longitudinally spaced cutout portions of the wing portions.

18. The crab plate of claim 11, wherein a surface area of each contact pad is within a range of approximately 5 to 5.5 inches squared.

19. The crab plate of claim 11, wherein the crab plate is made of 4140 steel.

20. A crab plate for securing a power assembly of an engine, comprising:

a body including a length direction oriented with respect to a central longitudinal plane, a width direction normal to the central longitudinal plane, and a thickness direction extending between a top surface and a bottom surface of the body;

the body further including a generally double-arrow shape including an arrowhead portion located at each of a first longitudinal end and a second longitudinal end of the body, wherein the body further includes:

a pair of retaining holes extending through the thickness of the body, the pair of retaining holes located along the central longitudinal plane;

a pair of wing portions forming laterally outward opposite sides of the body, the wing portions each include a pair of longitudinally spaced cutout portions; and a protruding contact pad on the bottom surface of each of the wing portions, the contact pads each having a surface area within a range of approximately 5 to 5.5 inches squared.

* * * * *